United States Patent
Peters et al.

(10) Patent No.: US 10,237,989 B1
(45) Date of Patent: Mar. 19, 2019

(54) FLEXIBLE PROTECTIVE HOUSING FOR ELECTRONIC DEVICES

(71) Applicant: AMAZON TECHNOLOGIES, INC., Seattle, WA (US)

(72) Inventors: David Eric Peters, Storrs, CT (US); Carl Philip Taussig, Woodside, CA (US); Shan Cheng, Los Altos, CA (US); Vikram Srinivas, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/446,623

(22) Filed: Mar. 1, 2017

(51) Int. Cl.
*G06F 1/16* (2006.01)
*H05K 5/00* (2006.01)
*H05K 7/00* (2006.01)
*H05K 5/03* (2006.01)

(52) U.S. Cl.
CPC ......... *H05K 5/0017* (2013.01); *G06F 1/1616* (2013.01); *H05K 5/03* (2013.01)

(58) Field of Classification Search
CPC .... G06F 1/1601; G06F 1/1613; G06F 1/1633; G06F 1/1652; G06F 1/1616; H05K 5/0017; H05K 5/03; H05K 5/0013
USPC ............. 361/679.21–679.3, 679.55, 679.56; 349/56–60
See application file for complete search history.

(56) References Cited

U.S. PATENT DOCUMENTS

| | | | | |
|---|---|---|---|---|
| 9,615,476 | B2* | 4/2017 | Rayner | H05K 5/061 |
| 9,622,556 | B2* | 4/2017 | Fathollahi | A45C 11/00 |
| 9,690,032 | B1* | 6/2017 | Nichol | G02B 6/0035 |
| 2011/0277361 | A1* | 11/2011 | Nichol | G02B 6/0018 |
| | | | | 40/541 |
| 2013/0234899 | A1* | 9/2013 | Pope | H01Q 1/243 |
| | | | | 343/702 |
| 2014/0152890 | A1* | 6/2014 | Rayner | G06F 1/1626 |
| | | | | 348/376 |

\* cited by examiner

*Primary Examiner* — Anthony M Haughton
(74) *Attorney, Agent, or Firm* — Eversheds Sutherland (US) LLP (57) ABSTRACT

A flexible housing for a flexible electronic device is coupled to a cover lens for enclosing components disposed between the flexible housing and the cover lens. The flexible housing includes a flexible polymer substrate. A first metal layer covering at least a portion of the flexible polymer substrate. A second metal layer is disposed on the first metal layer. A protective coating covers the second metal layer.

16 Claims, 3 Drawing Sheets

FLEXIBLE PROTECTIVE HOUSING FOR ELECTRONIC DEVICES

BACKGROUND

Electronic displays are found in numerous types of electronic devices including, without limitation, electronic book ("eBook") readers, mobile phones, laptop computers, desktop computers, televisions, appliances, automotive electronics, and augmented reality devices. Electronic displays may present various types of information, such as user interfaces, device operational status, digital content items, and the like, depending on the type and the purpose of the associated electronic device. The appearance and the quality of a display may affect a user's experience with the electronic device and the content presented thereon.

Conventional electronic device housings, e.g., bottom support plates of the electronic device, typically are formed of a rigid, metal material, such as aluminum. As flexible electronic devices begin to gain popularity with consumers, the electronic device housings necessarily must also be flexible to properly enclose and protect the electronic devices from damage and harmful environments. It is desirable for a flexible electronic device to include a protective housing that is flexible, lightweight, and aesthetically pleasing to the consumer.

BRIEF DESCRIPTION OF THE DRAWINGS

The detailed description is set forth with reference to the accompanying figures. The use of the same reference numbers in different figures indicates similar or identical items or features.

DETAILED DESCRIPTION

In embodiments described herein, a flexible electronic device, such as a flexible electronic display device, includes a flexible protective housing, e.g., a support plate, having a metallic finish. In certain example embodiments, the flexible protective housing at least partially forms a flexible first or bottom support plate of the flexible electronic device that is coupled to an opposing flexible, cover lens to enclose internal components of the electronic device, e.g., electronic components, within a recessed region created by the housing. In certain embodiments, the housing includes a bottom plate and side surfaces extending from the bottom plate to create the recessed region. In alternative embodiments, the flexible protective housing is coupled to an outer surface of a bottom support plate of the electronic device. In example embodiments, the lightweight housing is sufficiently flexible, resilient and strong to properly conform to the outer surfaces of the electronic device while providing an aesthetically pleasing metallic finish with one or more protective coatings, having suitable anti-fingerprint, an anti-corrosion and/or abrasion resistant properties, for example.

More specifically, in certain example embodiments, the flexible housing, e.g., the bottom support plate, includes a flexible substrate forming a base layer, such as a flexible polymer substrate including a thermoplastic elastomer (TPE) resin, for example. In certain embodiments, the flexible polymer substrate includes a suitable additive material, such as a laser direct structuring (LDS) material, to promote or facilitate a subsequent metallization process. Before the metallization process, the LDS material is activated within one or more surface areas of the flexible polymer substrate using a laser activation process known in the art to form a layer or film of metal material to promote a subsequent metal electroplating process. One or more layers of a metallic plating material is applied to the flexible polymer substrate. For example, in certain embodiments, a relatively thick layer of a first metal material, such as copper or nickel, is disposed on, e.g., formed on, the flexible polymer substrate using a suitable electroplating technique known to those having ordinary skill in the art of electroplating. A relatively thin layer of a second metal material, such as nanocrystalline cobalt, is then disposed on, e.g., formed on, the first metal layer. The electroplating processes provide the flexible housing with a cost effective, lightweight metal appearance and feel.

In certain embodiments, a protective coating is disposed over the metal material layers. In these embodiments, the second metal layer is textured using a suitable texturing process to promote adhesion of one or more protective coating layers applied over the second metal layer. In certain embodiments, a transitional material layer, e.g., a metal oxide layer or a metal nitride layer, is formed on the second metal layer, e.g., the nanocrystalline cobalt layer, using a suitable sol-gel process, for example, and one or more additional protective coating layers is disposed on, e.g., formed on or applied to, the transitional material layer. In certain embodiments, a primer material layer is applied to the transitional material layer before one or more protective coating or protective topcoat layers are disposed over, e.g., applied to, the transitional material layer to promote bonding of the one or more protective coating layers to the transitional material layer.

In contrast, many conventional electronic devices merely have a housing formed of a hard, rigid plastic or metal material, such as aluminum. These conventional housings are too rigid and do not have the required flexibility for use with a flexible electronic device. Further, many of these conventional housings lack a metallic feel and may not be aesthetically pleasing to consumers. As a result, the conventional housings are not suitable for use with flexible electronic devices.

Figure 1:
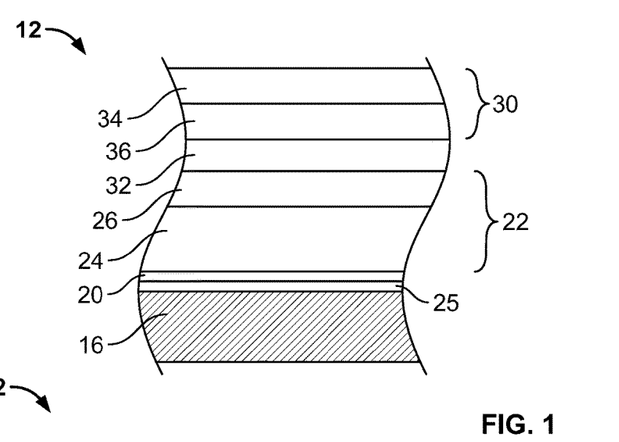
FIG. 1 is a schematic cross-sectional view of a portion of an example flexible housing for a flexible electronic device, according to various embodiments.
Figure 2:
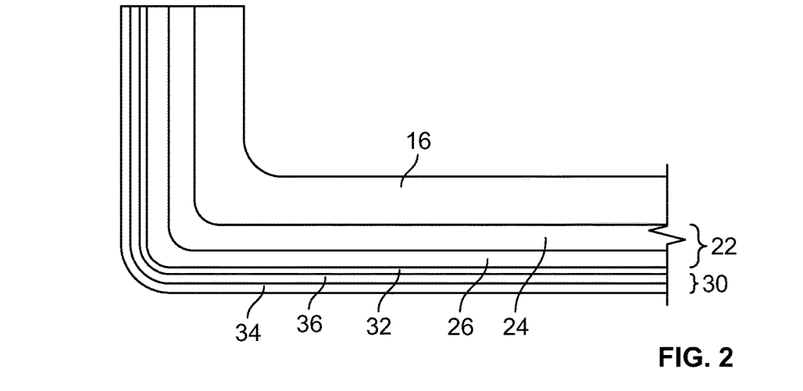
FIG. 2 is a cross-sectional view of a portion of an example flexible housing, according to various embodiments.
Figure 3:
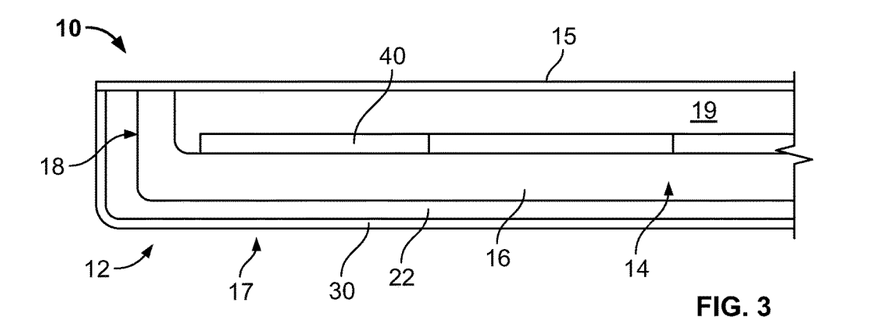
FIG. 3 is a cross-sectional view of a portion of an example flexible electronic device including a flexible housing, according to various embodiments.

Referring to the figures, and initially, to FIGS. 1-3, a flexible electronic device 10, such as a flexible electronic display device, shown in FIG. 3, includes a protective, flexible housing 12, e.g., a first or bottom support plate 14. FIG. 1 is a schematic cross-sectional view of a portion of flexible housing 12 for flexible electronic device 10, according to various embodiments. FIG. 2 is a cross-sectional view of a portion of flexible housing 12 and FIG. 3 is a cross-sectional view of a portion of an example flexible electronic device 10 including flexible housing 12, according to various embodiments.

In example embodiments, flexible housing 12 for flexible electronic device 10, such as a flexible electronic display device, is coupled to an opposing, flexible, cover lens 15 to enclose internal components of flexible electronic device 10.

In certain embodiments, cover lens 15 is transparent. Flexible housing 12 includes a flexible substrate 16 formed of a flexible polymer material. In example embodiments, flexible substrate 16 includes, for example, a suitable thermoplastic elastomer (TPE) resin, a thermoplastic polyurethane (TPU) resin, an acrylonitrile butadiene styrene (ABS) material, a silicone material, or other flexible and platable polymer or plastic materials with or without additives. The TPE resin, for example, provides flexible substrate 16 with the flexibility and resiliency required to enclose at least a portion of flexible electronic device 10, as described herein. In certain example embodiments, the TPE resin is an Arnitel® thermoplastic copolyester (TPC) resin available from DMS located in Troy Mich., USA, that offers flexibility, high temperature resistance and strength.

As described herein, thermoplastic elastomers, sometimes referred to as thermoplastic rubbers, are a class of copolymers or a physical mix of polymers (e.g., a plastic and a rubber) which consist of materials with both thermoplastic and elastomeric properties. Thermoplastic elastomers can be easily fabricated using conventional thermoplastic fabricating methods such as, for example, injection molding or extrusion. Other suitable processing methods may include blow molding, melt calendaring, thermoforming, or heat welding. Suitable thermoplastic elastomers may include, without limitation, styrenic block copolymers (TPE-s), thermoplastic olefins (TPE-o), elastomeric alloys (TPE-v or TPV), thermoplastic polyurethanes (TPU), thermoplastic copolyester (TPE-E), or thermoplastic polyamides. Examples of TPE products that come from block copolymers group are THERMOLAST®, HIPEX®, COPEC®, and For Tec E® (KRAIBURG TPE), Santoprene (ExxonMobil), Termoton by Termopol Polimer, Arnitel® (DSM), Solprene (Dynasol), Engage (Dow Chemical), Hytrel (Du Pont), Dryflex and Mediprene (ELASTO), Kraton (Kraton Polymers), Pibiflex. Examples of suitable elastomeric alloys (TPV) are THERMOLAST® A, THERMOLAST® V, HIPEX®, FORPRENE, and TERMOTON-V. Examples of suitable styrenic block copolymers (TPE-s) are THERMOLAST® K (SEBS), THERMOLAST® M (SEBS), SOFPRENE (SBS) and LAPRENE (SEBS). An example of a suitable thermoplastic polyurethane (TPU) compound is COPEC®. An example of a suitable thermoplastic olefin (TPO) compound is For-Tec E®. These thermoplastic elastomers have three essential characteristics, namely, an ability to be stretched to moderate elongations and, upon the removal of stress, return substantially to its original shape, processability as a melt at elevated temperature, and an absence of significant creep. Other suitable materials including flexible polymers, such as NEOPRENE (DuPont), may also be used to fabricate flexible substrate 16.

In example embodiments, flexible substrate 16 is laser activated to promote the subsequent metallization process. In certain example embodiments, the laser activation is achieved using a laser direct structuring (LDS) technique, such as an LDS technique developed by LPKF Laser & Electronics AG located in Garbsen, Germany. In this LPKF technique, a metal-organic compound—based on either palladium (Pd2+) or copper (Cu2+)—is dispersed in the flexible polymer resin. One or more surfaces of the flexible polymer resin including the metal-organic compound are exposed to a laser to structure the material for a subsequent metallization process. In certain example embodiments, flexible substrate 16 includes a suitable additive material, such as an LDS additive material, blended with the flexible polymer resin, e.g., the TPE resin, to promote or facilitate the subsequent metallization process. The use of the LDS additive material avoids the requirement of a typical chemical activation process for metallization. Using a laser, one or both opposing surfaces of flexible substrate 16 (or one or more regions or areas of the one or both opposing surfaces) including the LDS additive material can be activated to produce one or more platable areas suitable for applying a metal electroplate material thereto, i.e., an entire surface of flexible substrate 16 may be laser activated or one or more regions or areas of the surface may be selectively laser activated. In example embodiments, flexible substrate 16 includes a sufficient amount of LDS additive material to form a thin metal film or layer on a surface of flexible substrate 16 to promote the subsequent electroplating process. In example embodiments, flexible substrate 16 includes 0.25 wt % to 5.00 wt % additive material, and, more particularly, flexible substrate 16 includes 0.25 wt % to 1.25 wt % additive material and, even more particularly, flexible substrate 16 includes 1.00 wt % additive material. In certain example embodiments, flexible substrate 16 includes 95.00 wt % to 99.75 wt % flexible polymer material and 0.25 wt % to 5.00 wt % additive material, and, more particularly, flexible substrate 16 includes 98.75 wt % to 99.75 wt % flexible polymer material and 0.25 wt % to 1.25 wt % additive material and, even more particularly, flexible substrate 16 includes 99.00 wt % flexible polymer material and 1.00 wt % additive material. In particular example embodiments, flexible substrate 16 includes 95.00 wt % to 99.75 wt % thermoplastic elastomer resin and 0.25 wt % to 5.00 wt % laser direct structuring additive material, and, more particularly, flexible substrate 16 includes 98.75 wt % to 99.75 wt % thermoplastic elastomer resin and 0.25 wt % to 1.25 wt % laser direct structuring additive material and, even more particularly, flexible substrate 16 includes 99.00 wt % thermoplastic elastomer resin and 1.00 wt % laser direct structuring additive material.

In alternative example embodiments, the laser activation of one or more surfaces (or one or more regions or areas of the one or both opposing surfaces) of flexible substrate 16 is achieved using a laser induced selective activation (LISA) technique, such as a laser selective plating technique developed by Jabil Green Point, that does not require an additive material dispersed in the flexible polymer resin.

As show in FIG. 3, flexible substrate 16 includes a bottom plate 17 and one or more side surfaces 18 extending from bottom plate 17 that contact cover lens 15 to enclose the internal components, e.g., electronic components, of flexible electronic device 10. In certain example embodiments, flexible housing 12 includes bottom plate 17 and side surface 18 that create a recessed region 19 in which components of flexible electronic device 10 are received.

Once flexible substrate 16 is formed, a metallization process provides a cost-effective, lightweight, flexible housing 12 having a metallic look and feel. A number of suitable metal materials may be selected for this process. For example, in certain embodiments, a nanocrystalline cobalt is chosen for its strength, resilience, and ability to produce an appropriate luster to flexible housing 12. Other advantages to the nanocrystalline cobalt include that ability to provide a single side plating for a thin metal finish and the potential integration of an antenna. Prior to or as an initial step in the metallization process, in certain embodiments, a thin layer 20 of nickel or copper (or a nickel alloy, e.g., a nickel-phosphorus or nickel-boron alloy, or a copper alloy) having a thickness not greater than 3.0 micrometers, and, more particularly, a thickness not greater than 1.0 micrometer, is disposed on, e.g., formed or deposited on, flexible substrate 16 using a suitable electroless process known to those having ordinary skill in the art.

Referring further to FIG. 1, during the metallization process, a metal stack 22 includes one or more layers of metal electroplate material disposed over flexible substrate 16. In example embodiments, metal stack 22 includes a first metal layer 24 including an electroplate metal material, for example, an electroplated copper layer or an electroplated nickel layer, disposed on flexible substrate 16 using a suitable electroplating process known to those skilled in the art. First metal layer 24 may completely cover one or more surfaces of flexible substrate 16 or, alternatively, first metal layer 24 may cover one or more regions of one or more surfaces of flexible substrate 16. In example embodiments, first metal layer 24 has a thickness of 5.0 micrometers to 50.0 micrometers, and, more particularly, first metal layer 24 has a thickness of 3.0 micrometers to 20.0 micrometers, and, even more particularly, first metal layer 24 has a thickness of 10.0 micrometers to 20.0 micrometers. In a particular embodiment, the additive material includes an LDS additive material forming a promoting layer 25 on a surface of flexible substrate 16, and metal stack 22 includes first metal layer 24 disposed on promoting layer 25. In certain embodiments in which flexible substrate 16 includes an additive material, such as an LDS additive material, promoting layer 25 is formed as a result of the laser activation of flexible substrate 16 and promotes subsequent electroplating of metal materials on the activated surface or activated regions of flexible substrate 16.

Referring further to FIG. 1, metal stack 22 also includes a second metal layer 26 including an electroplate metal material, for example, an electroplated nanocrystalline cobalt layer, disposed on first metal layer 24 using a suitable electroplating process known to those skilled in the art, such as the electroplating process utilized to dispose first metal layer 24 on flexible substrate 16. Other suitable metal materials for forming first metal layer 24 and/or second metal layer 26 may include, without limitation, nickel, aluminum, gold, silver, platinum, palladium, or any metallic electroplate material that can be applied using an electroplating process. As used in relation to these example embodiments, the term "metal material" may include the elemental metal and/or alloys or composites including the elemental metal that can be disposed on flexible substrate 16 and/or another metal material layer using an electroplating process. In example embodiments, second metal layer 26 has a thickness of up to 500.0 micrometers, and, more particularly, second metal layer 26 has a thickness of 2.5 micrometers to 50.0 micrometers, and, even more particularly, second metal layer 26 has a thickness of 5.0 micrometers to 10.0 micrometers. In certain example embodiments, metal stack 22 has an overall thickness of 505.0 micrometers to 550.0 micrometers, and, more particularly, an overall thickness of 5.5 micrometers to 70.0 micrometers, and, even more particularly, an overall thickness of 15.0 micrometers to 30.0 micrometers. In certain embodiments, first metal layer 24 has a thickness greater than a thickness of second metal layer 26. In alternative embodiments, first metal layer 24 and/or second metal layer 26 may having any suitable thickness depending, at least in part, on the material and the application.

In a particular embodiment, first metal layer 24 includes an electroplated copper layer having a thickness of 10.0 micrometers to 20.0 micrometers and second metal layer 26 includes an electroplated nanocrystalline cobalt layer having a thickness of 5.0 micrometers to 10.0 micrometers. Other metal materials including, without limitation, those described herein, can be used to form first metal layer 24 and/or second metal layer 26 in alternative embodiments. The plating metallurgy and metal layers are selected so that the relatively thicker, softer first metal layer 24, e.g., the electroplated copper layer, is positioned under the relatively thinner, harder second metal layer 26, e.g., the electroplated nanocrystalline cobalt layer, to promote texturing second metal layer 26 using a suitable texturing process, such as a glass bead blasting, sand blasting or any other suitable mechanical texturing process. Texturing an outer surface of second metal layer 26 enhances the aesthetics of flexible housing 12. In alternative embodiments, additives may be included in the electroplating process to texture the outer surface of second metal layer 26.

In example embodiments, a coating, such as a protective coating 30, including one or more coating layers is formed on metal stack 22. More specifically, one or more protective coating layers, e.g., an anti-fingerprint coating, are disposed on metal stack 22, e.g., on an outer surface of second metal layer 26, to provide metal stack 22 with protective coating 30 having anti-fingerprint (AFP), anti-corrosion, and/or abrasion resistant properties. In example embodiments, protective coating 30 includes a suitable transitional material layer 32 to promote adhesion of protective coating 30 to metal stack 22. In example embodiments, transitional material layer 32 includes a metal oxide or metal nitride material layer, e.g., zirconium oxide or chromium nitride, disposed on second metal layer 26 to facilitate or promote adhesion of topcoat 34 to metal stack 22. Other transitional materials may also be used to form transitional material layer 32.

In certain example embodiments, transitional material layer 32, e.g., a metal oxide material layer, a metal nitride material layer, a silicon oxide material layer or a titanium oxide material layer, is formed on metal stack 22 using a sol-gel process known to those having ordinary skill in the art. In these embodiments, a liquid transitional material is applied to the outer surface of second metal layer 26, e.g., an outer surface of the electroplated nanocrystalline cobalt layer, using a spraying, dipping, or rolling technique, for example. During the sol-gel process, solid materials are produced from small molecules. In certain embodiments, metal oxides, e.g., oxides of silicon or oxides of titanium, are fabricated by converting monomers into a colloidal solution (sol) that acts as the precursor for an integrated network (or gel) of either discrete particles or network polymers. Typical precursors are metal alkoxides. A subsequent curing treatment, e.g., an ultraviolet (UV) or a suitable thermal curing process, enhances the mechanical properties and structural stability of transitional material layer 32. Temperatures to which the flexible housing 12 are exposed during the curing treatment must not adversely affect the stability of flexible substrate 16. In a particular embodiment, the precursor sol is deposited on metal stack 22, e.g., on an outer surface of the second metal layer, to form a film (e.g., by dip coating or spin coating). In example embodiments, transitional material layer 32 has a thickness of 1.0 nanometers to 200.0 nanometers, and, more particularly, a thickness less than 50.0 nanometers.

Once transitional material layer 32 is cured, a protective topcoat 34 including one or more protective layers having appropriate anti-fingerprint (AFP), anti-corrosion, and/or abrasion resistant properties is disposed over transitional material layer 32. In one embodiment, protective topcoat 34 includes an AFP topcoat, such as a TROYSOL AFP material layer having a micro-milled calcium carbonate power treated with non-ionic surface active agents and pigment dispersants, disposed over the metal oxide material or the metal nitride material. Protective topcoat 34 may be applied directly to transitional material layer 32, e.g., applied directly to the metal oxide material layer or the metal nitride material. Alternatively, in a particular embodiment, a primer material layer 36, such as a clear polyurethane, a paint, an acrylic, a polyester material layer or a material layer formed using a sol-gel process as described herein, is disposed between transitional material layer 32, e.g., the metal oxide material layer or the metal nitride material, and protective topcoat 34.

In a particular embodiment, protective coating 30 includes a metal oxide layer or a metal nitride layer having a thickness of 25.0 nanometers to 125.0 nanometers, and, more particularly, a metal oxide layer or a metal nitride layer having a thickness of 50.0 nanometers to 100.0 nanometers disposed on second metal layer 26, e.g., the electroplated nanocrystalline cobalt layer. Primer material layer 36 is disposed on the metal oxide layer. Primer material layer 36 has a thickness of 2.5 micrometers to 50.0 micrometers, and, more particularly, primer material layer 36 has a thickness of 5.0 micrometers to 15.0 micrometers. Protective topcoat 34 is disposed on primer material layer 36. Protective topcoat 34 has a thickness of 5.0 micrometers to 40.0 micrometers, and, more particularly, protective topcoat 34 has a thickness of 10.0 micrometers to 30.0 micrometers.

Referring further to FIG. 3, flexible electronic device 10 includes flexible housing 12, e.g., first or bottom support plate 14, and opposing flexible cover lens 15 coupled to flexible housing 12. Device components, such as electronic components, are positioned or formed within recessed region 19 between flexible housing 12 and cover lens 15. In certain embodiments, a pixel region may include a pixel or a pixel having two or more sub-pixels of a display device. Such pixels or sub-pixels may be the smallest light transmissive, reflective or transflective unit of a display that is individually operable to directly control an amount of light transmission through or reflection from the pixel region. For example, in some embodiments, a pixel may include a red sub-pixel, a green sub-pixel, a blue sub-pixel, and a white sub-pixel for RGBW displays. In other embodiments, a pixel may be a smallest component, e.g., the pixel does not include any sub-pixels.

In various embodiments described herein, flexible electronic devices may include one or more components associated with a display, such as a touch sensor component layered atop the display for detecting touch inputs, a front light and/or a back light component for lighting the display, for example.

Hereinafter, example embodiments include, but are not limited to, displays having a clear or transparent cover lens. Describing a component or material as being "transparent" generally means that the component or the material may transmit a relatively large fraction of the light incident upon it. For example, a transparent material or layer might transmit more than 70% or 80% of the light impinging on its surface, although in other examples a transparent material or structure might transmit a different percentage of incident light. In general, transparent materials or structures need not be perfectly transparent. In general, "top" and "bottom" may be used to identify opposing support plates of a display and do not necessarily refer to a direction referenced to gravity or to a viewing side of the display device. In example embodiments, the cover lens is the surface through which pixels of a display are viewed.

In some embodiments, the electronic device as described herein may be incorporated into a system that includes one or more processors and one or more computer memories, which may reside on a control board, for example. Display software may be stored on the one or more memories and may be operable with the one or more processors to modulate light that is received from an outside source (e.g., ambient room light) or out-coupled from a lightguide of the electronic device. For example, display software may include code executable by a processor to modulate optical properties of individual pixels of the electronic device based at least in part on electronic signals representative of static image and/or video data. The code may cause the processor to modulate the optical properties of pixels by controlling electrical signals (e.g., voltages, currents, and fields) on, over, and/or in layers of the electronic device.

Referring further to FIG. 3, electronic components 40 (shown schematically in FIG. 3) are formed on or over flexible housing 12 and within recessed region 19 between flexible housing 12 and cover lens 15. In one example embodiment, a flexible housing for a flexible electronic device is coupled to an opposing, transparent cover lens. The flexible housing includes a bottom plate and one or more, e.g., four, side surfaces extending from the bottom plate creating a recessed region in which to receive components of the flexible electronic device. The flexible housing includes a flexible substrate comprising a thermoplastic elastomer (TPE) resin and a laser direct structuring (LDS) additive material. A copper layer covers, e.g., is disposed on, the flexible substrate. A nanocrystalline cobalt layer covers, e.g., is disposed on, the copper layer. A coating covers, e.g., is disposed on, the nanocrystalline cobalt layer. The coating includes an anti-fingerprint (AFP) topcoat disposed over the metal oxide material. In a particular embodiment, a transitional material layer, such as a metal oxide material, is disposed on the nanocrystalline cobalt layer and a primer material layer is disposed between the transitional material layer and the AFP topcoat.

In an example embodiment, a flexible housing for a flexible electronic device includes a bottom plate and four side surfaces extending from the bottom plate to create a recessed region in which to receive components of the flexible electronic device. The flexible housing includes a flexible substrate comprising a thermoplastic elastomer (TPE) resin and a laser direct structuring (LDS) additive material. A copper layer covers the flexible substrate. A nanocrystalline cobalt layer covers the copper layer. An anti-fingerprint (AFP) coating covers the nanocrystalline cobalt layer. The flexible housing may include a transitional material layer disposed on the nanocrystalline cobalt layer and a primer material layer disposed between the transitional material layer and the AFP coating, wherein the transitional material layer and the primer material layer are configured to promote adhesion of the AFP coating to the nanocrystalline cobalt layer. In a particular embodiment, the flexible substrate comprises 95.00 wt % to 99.75 wt % TPE resin and 0.25 wt % to 5.00 wt % LDS additive material. In a particular embodiment, the copper layer has a thickness of 10.0 micrometers to 20.0 micrometers and the nanocrystalline cobalt layer has a thickness of 5.0 micrometers to 10.0 micrometers.

In another example embodiment, a flexible electronic device includes a flexible housing having a recessed region in which to receive components of the flexible electronic device. The flexible housing includes a flexible polymer substrate having one or more side surfaces. A metal stack is disposed on the polymer substrate. More specifically, a first metal layer is disposed on at least a portion of the flexible polymer substrate and a second metal layer is disposed on the first metal layer. A protective coating is disposed on the metal stack. More specifically, a protective coating is disposed over the second metal layer. In a particular embodiment, the protective coating includes a transitional material layer disposed on the metal stack. A protective coating is disposed over the transitional material layer. A transparent, flexible cover lens is positioned over the recessed region and coupled to the flexible housing.

In another example embodiment, a flexible housing for a flexible electronic device is coupled to a cover lens for enclosing components of the flexible electronic device disposed between the flexible housing and the cover lens. The flexible housing includes a flexible polymer substrate. A first metal layer covers, e.g., is disposed on, at least a portion of the flexible polymer substrate. A second metal layer is disposed on the first metal layer. A protective coating covers, e.g., is disposed over, the second metal layer.

Figure 4:
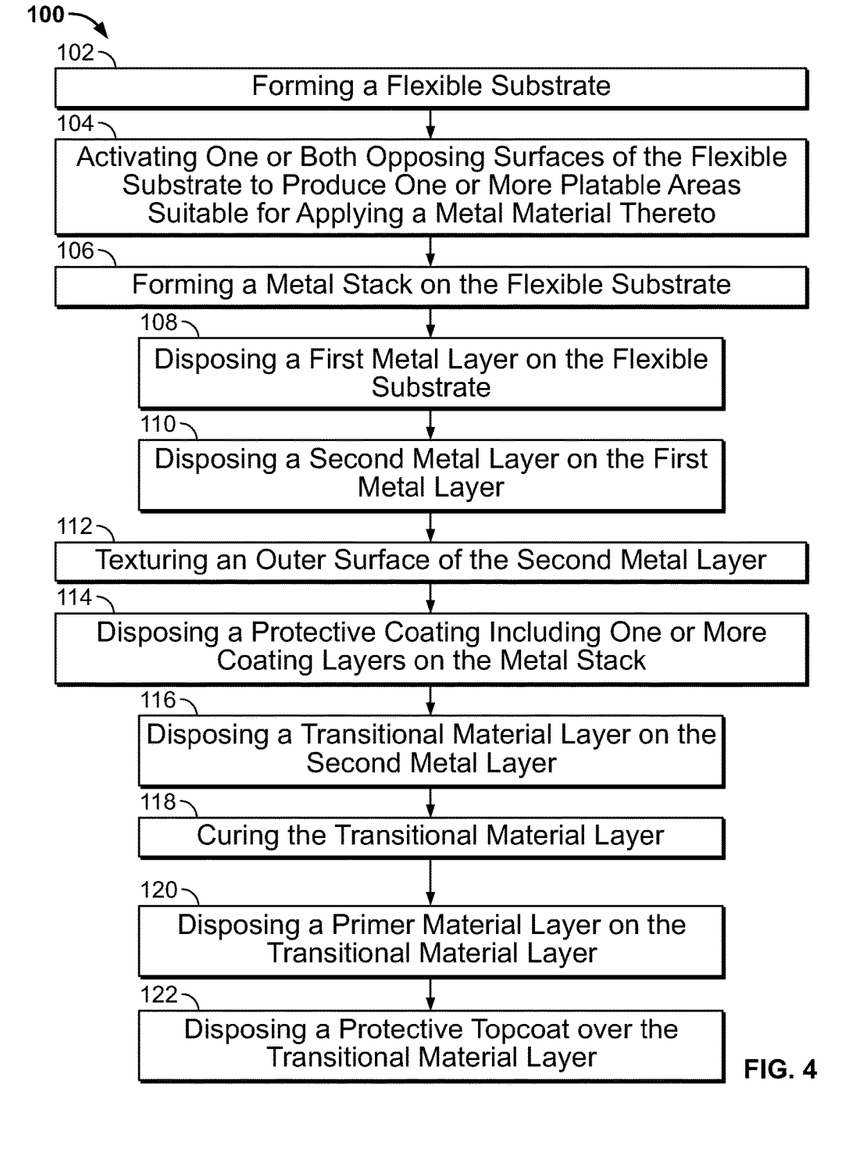
FIG. 4 illustrates an example method for fabricating an example flexible housing for a flexible electronic device such as shown in FIGS. 1-3.

FIG. 4 is a flow diagram of an example method 100 for fabricating an example flexible housing 12 for an electronic device, such as flexible electronic device 10 as shown in FIG. 3. At block 102, a flexible substrate is formed of a flexible polymer material. In example embodiments, the flexible substrate includes, for example, a suitable thermoplastic elastomer (TPE) resin, a thermoplastic polyurethane (TPU) resin, an acrylonitrile butadiene styrene (ABS) material, a silicone material, or other flexible and platable polymer or plastic materials with or without additives. In certain example embodiments, the TPE resin is an Arnitel® thermoplastic copolyester (TPC) resin available from DMS located in Troy Mich., USA, that offers flexibility, high temperature resistance and strength. As described above, suitable thermoplastic elastomers may include, without limitation, styrenic block copolymers (TPE-s), thermoplastic olefins (TPE-o), elastomeric alloys (TPE-v or TPV), thermoplastic polyurethanes (TPU), thermoplastic copolyester (TPE-E), or thermoplastic polyamides, as described above. Other suitable materials including flexible polymers, such as NEOPRENE (DuPont), may also be used to fabricate the flexible substrate. In certain example embodiments, an additive material, such as a laser direct structuring (LDS) additive material, is added to the flexible substrate, e.g., blended with the TPE resin, to promote or facilitate the subsequent metallization process. The use of the LDS additive material avoids the requirement of a typical chemical activation process for metallization.

At block 104, one or both opposing surfaces of the flexible substrate including the additive material is activated, using a suitable laser activation process, for example, to produce one or more platable areas suitable for applying a metal electroplate material thereto. In example embodiments, the flexible substrate includes a sufficient amount of LDS additive material to form a thin metal film or layer on a surface of the flexible substrate to promote the subsequent electroplating process.

At block 106, a metallization process is performed to form a metal stack over the flexible substrate to provide a cost-effective, lightweight flexible housing having a metallic look and feel. Prior to or as an initial step in the metallization process, in certain embodiments, a thin layer of nickel or copper (or a nickel alloy, e.g., a nickel-phosphorus or nickel-boron alloy, or a copper alloy) having a thickness not greater than 3.0 micrometers is disposed on the flexible substrate using a suitable electroless process known to those having ordinary skill in the art.

During the metallization process, a metal stack including one or more layers of metal electroplate material, is disposed over, e.g., formed on the flexible substrate. In example embodiments, the metal stack includes a first metal layer including an electroplate metal material, for example, an electroplated copper layer, disposed 108 on the flexible substrate using a suitable electroplating process known to those skilled in the art. In example embodiments, the first metal layer has a thickness of 5.0 micrometers to 50.0 micrometers, and, more particularly, first metal layer 24 has a thickness of 3.0 micrometers to 20.0 micrometers, and, even more particularly, first metal layer 24 has a thickness of 10.0 micrometers to 20.0 micrometers. In a particular embodiment, the seed electroplating additive material includes an LDS additive material forming a promoting layer (not shown in the figures) on a surface of the flexible substrate, and the metal stack includes the first metal layer disposed on the promoting layer.

The metal stack also includes a second metal layer including an electroplate metal material, for example, an electroplated nanocrystalline cobalt layer, disposed 110 on the first metal layer using a suitable electroplating process known to those skilled in the art, such as the electroplating process utilized to dispose the first metal layer on the flexible substrate. Other suitable metal materials for forming the first metal layer and/or the second metal layer may include, without limitation, aluminum, gold, silver, platinum, palladium, or any metallic electroplate material that can be applied using an electroplating process. In example embodiments, the second metal layer has a thickness of up to 500.0 micrometers, and, more particularly, second metal layer 26 has a thickness of 2.5 micrometers to 50.0 micrometers, and, even more particularly, the second metal layer has a thickness of 5.0 micrometers to 10.0 micrometers. In certain example embodiments, the metal stack 22 has an overall thickness of 505.0 micrometers to 550.0 micrometers, and, more particularly, an overall thickness of 5.5 micrometers to 70.0 micrometers, and, even more particularly, an overall thickness of 15.0 micrometers to 30.0 micrometers. In certain embodiments, the first metal layer has a thickness greater than a thickness of the second metal layer.

In a particular embodiment, the first metal layer includes a copper layer having a thickness of 10.0 micrometers to 20.0 micrometers and the second metal layer includes a nanocrystalline cobalt layer having a thickness of 5.0 micrometers to 10.0 micrometers. Other metal materials including, without limitation, those described herein, can be used to form the first metal layer and/or the second metal layer in alternative embodiments. The plating metallurgy and metal layers are selected so that the relatively thicker, softer first metal layer, e.g., the copper layer, is positioned under the relatively thinner, harder second metal layer, e.g., the nanocrystalline cobalt layer, to promote texturing 112 the second metal layer using a suitable texturing process, such as a glass bead blasting, sand blasting or any other suitable mechanical texturing process. Texturing 112 an outer surface of the second metal layer enhances the aesthetics of the flexible housing. In alternative embodiments, additives may be included in the electroplating process to texture the outer surface of the second metal layer.

In example embodiments, a coating, such as a protective coating, including one or more coating layers is disposed 114 on the metal stack. More specifically, one or more coating layers are disposed on, e.g., sprayed or rolled onto, the metal stack, e.g., on an outer surface of the second metal layer, to provide the metal stack with the protective coating having anti-fingerprint (AFP), anti-corrosion, and/or abrasion resistant properties. In example embodiments, the protective coating includes a suitable transitional material layer to promote adhesion of the protective coating to the metal stack. In example embodiments, at block 116 the transitional material layer includes a metal oxide or metal nitride material layer, e.g., zirconium oxide or chromium nitride, disposed on, e.g., formed on, the second metal layer to facilitate or promote adhesion of the protective coating to the metal stack.

In certain example embodiments, the transitional material layer is formed on the metal stack using a sol-gel process. In these embodiments, a liquid transitional material is applied to the outer surface of the second metal layer, e.g., an outer surface of the electroplated nanocrystalline cobalt layer, using a spraying, dipping, or rolling technique, for example. In a particular embodiment, the precursor sol is deposited on the metal stack, e.g., on an outer surface of the second metal layer, to form a film (e.g., by dip coating or spin coating). In example embodiments, the transitional layer has a thickness of 1.0 nanometers to 200.0 nanometers, and, more particularly, a thickness less than 50.0 nanometers.

The transitional material layer is cured 118 and a protective coating, e.g., a protective topcoat, including one or more protective layers having appropriate anti-fingerprint (AFP), anti-corrosion, and/or abrasion resistant properties is disposed over the transitional material layer at block 122. In one embodiment, the protective coating includes an AFP topcoat disposed over the metal oxide material. The protective coating may be applied directly to the transitional material layer, e.g., applied directly to the metal oxide material layer. Alternatively, in a particular embodiment, a primer material layer, such as a clear polyurethane material layer, is disposed 120 on the transitional material layer between the transitional material layer, e.g., the metal oxide material layer, and the protective coating.

In a particular embodiment, the protective coating includes a metal oxide layer or a metal nitride layer having a thickness of 25.0 nanometers to 125.0 nanometers, and, more particularly, a metal oxide layer or a metal nitride layer having a thickness of 50.0 nanometers to 100.0 nanometers disposed on the second metal layer, e.g., the nanocrystalline cobalt layer. The primer material layer is disposed on the metal oxide layer or the metal nitride layer. The primer material layer has a thickness of 2.5 micrometers to 50.0 micrometers, and, more particularly, the primer material layer has a thickness of 5.0 micrometers to 15.0 micrometers. The protective topcoat is disposed on the primer material layer. The protective topcoat has a thickness of 5.0 micrometers to 40.0 micrometers, and, more particularly, the protective topcoat has a thickness of 10.0 micrometers to 30.0 micrometers.

Figure 5:
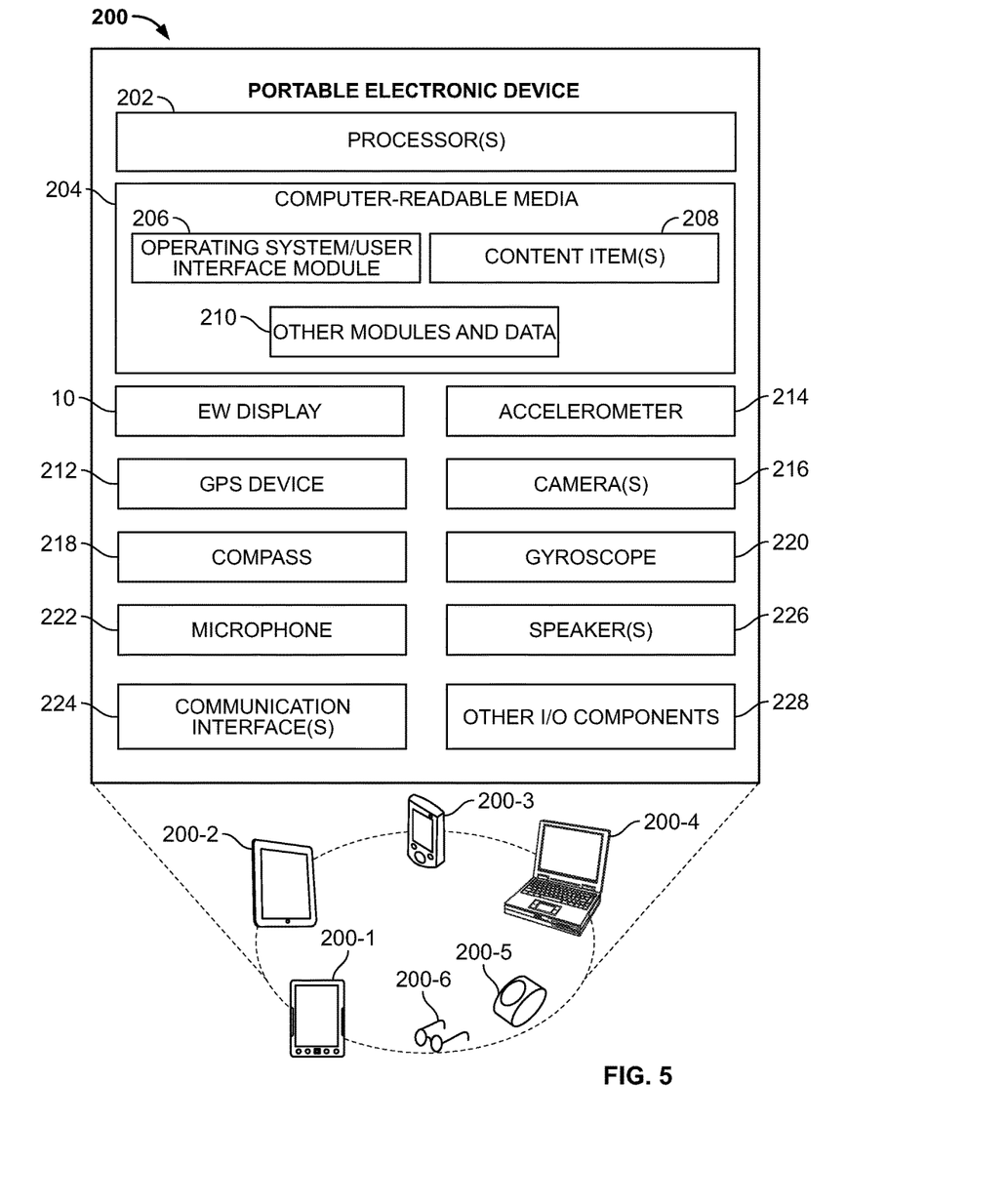
FIG. 5 illustrates example flexible electronic devices, according to various embodiments.

FIG. 5 illustrates select example components of an example image display apparatus 200 that may be used with electronic device 10 according to some implementations. Types of displays suitable for use with the example image display apparatus 200 include, but are not limited to, electrowetting displays, LCDs, cholesteric displays, electrophoretic displays, electrofluidic pixel displays, photonic ink displays, and the like.

Image display apparatus 200 may be implemented as any of a number of different types of electronic devices. Some examples of image display apparatus 200 may include digital media devices and eBook readers 200-1; tablet computing devices 200-2; smart phones, mobile devices and portable gaming systems 200-3; laptop and netbook computing devices 200-4; wearable computing devices 200-5; augmented reality devices, helmets, goggles or glasses 200-6; and any other device capable of connecting with flexible electronic device 10 and including a processor and memory for controlling the display according to the techniques described herein.

In a very basic configuration, image display apparatus 200 includes, or accesses, components such as at least one control logic circuit, central processing unit, or processor 202, and one or more computer-readable media 204. Each processor 202 may itself comprise one or more processors or processing cores. For example, processor 202 can be implemented as one or more microprocessors, microcomputers, microcontrollers, digital signal processors, central processing units, state machines, logic circuitries, and/or any devices that manipulate signals based on operational instructions. In some cases, processor 202 may be one or more hardware processors and/or logic circuits of any suitable type specifically programmed or configured to execute the algorithms and processes described herein. Processor 202 can be configured to fetch and execute computer-readable instructions stored in computer-readable media 204 or other computer-readable media. Processor 202 can perform one or more of the functions attributed to timing controller 102, source driver 104, and/or gate driver 106 of flexible electronic device 10. Processor 202 can also perform one or more functions attributed to a graphic controller (not illustrated) for the flexible electronic device.

Depending on the configuration of image display apparatus 200, computer-readable media 204 may be an example of tangible non-transitory computer storage media and may include volatile and nonvolatile memory and/or removable and non-removable media implemented in any type of technology for storage of information such as computer-readable instructions, data structures, program modules or other data. Computer-readable media 204 may include, but is not limited to, RAM, ROM, EEPROM, flash memory or other computer readable media technology, CD-ROM, digital versatile disks (DVD) or other optical storage, magnetic cassettes, magnetic tape, solid-state storage and/or magnetic disk storage. Further, in some cases, image display apparatus 200 may access external storage, such as RAID storage systems, storage arrays, network attached storage, storage area networks, cloud storage, or any other medium that can be used to store information and that can be accessed by processor 202 directly or through another computing device or network. Accordingly, computer-readable media 204 may be computer storage media able to store instructions, modules or components that may be executed by processor 202.

Computer-readable media 204 may be used to store and maintain any number of functional components that are executable by processor 202. In some implementations, these functional components comprise instructions or programs that are executable by processor 202 and that, when executed, implement operational logic for performing the actions attributed above to image display apparatus 200. Functional components of image display apparatus 200 stored in computer-readable media 204 may include the operating system and user interface module 206 for controlling and managing various functions of image display apparatus 200, and for generating one or more user interfaces on flexible electronic device 10 of image display apparatus 200.

In addition, computer-readable media 204 may also store data, data structures and the like, that are used by the functional components. For example, data stored by computer-readable media 204 may include user information and, optionally, one or more content items 208. Depending on the type of image display apparatus 200, computer-readable media 204 may also optionally include other functional components and data, such as other modules and data 210, which may include programs, drivers and so forth, and the data used by the functional components. Further, image display apparatus 200 may include many other logical, programmatic and physical components, of which those described are merely examples that are related to the discussion herein. Further, while the figures illustrate the functional components and data of image display apparatus 200 as being present on image display apparatus 200 and executed by processor 202 on image display apparatus 200, it is to be appreciated that these components and/or data may be distributed across different computing devices and locations in any manner.

FIG. 5 further illustrates examples of other components that may be included in image display apparatus 200. Such examples include various types of sensors, which may include a GPS device 212, an accelerometer 214, one or more cameras 216, a compass 218, a gyroscope 220, a microphone 222, and so forth.

Image display apparatus 200 may further include one or more communication interfaces 224, which may support both wired and wireless connection to various networks, such as cellular networks, radio, Wi-Fi networks, close-range wireless connections, near-field connections, infrared signals, local area networks, wide area networks, the Internet, and so forth. Communication interfaces 224 may further allow a user to access storage on or through another device, such as a remote computing device, a network attached storage device, cloud storage, or the like.

Image display apparatus 200 may further be equipped with one or more speakers 226 and various other input/output (I/O) components 228. Such I/O components 228 may include a touchscreen and various user controls (e.g., buttons, a joystick, a keyboard, a keypad, etc.), a haptic or tactile output device, connection ports, physical condition sensors, and so forth. For example, operating system 206 of image display apparatus 200 may include suitable drivers configured to accept input from a keypad, keyboard, or other user controls and devices included as I/O components 228. Additionally, image display apparatus 200 may include various other components that are not shown, examples of which include removable storage, a power source, such as a battery and power control unit, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A flexible electronic device, comprising:
 a flexible housing having a recessed region in which to receive components of the flexible electronic device, the flexible housing comprising:
  a flexible polymer substrate having a first surface and one or more side surfaces forming the recessed region, and a second surface opposite the first surface;
  a first metal layer disposed on at least a portion of the second surface of the flexible polymer substrate;
  a second metal layer disposed on the first metal layer; and
  a protective coating disposed on the second metal layer; and
 a flexible cover lens positioned over the recessed region and coupled to the flexible housing.

2. The flexible electronic device of claim 1, wherein the flexible polymer substrate comprises a flexible thermoplastic elastomer (TPE) substrate.

3. The flexible electronic device of claim 2, wherein the flexible TPE substrate comprises one of: a styrenic block copolymer, a thermoplastic olefin, an elastomeric alloy, a thermoplastic polyurethane, a thermoplastic copolyester, a thermoplastic polyamide, or a silicone material.

4. The flexible electronic device of claim 1, wherein the flexible polymer substrate includes a laser direct structuring (LDS) additive material.

5. The flexible electronic device of claim 1, further comprising a promoting layer disposed on the flexible polymer substrate, wherein the first metal layer is disposed on the promoting layer.

6. The flexible electronic device of claim 1, further comprising a transitional material layer disposed on the second metal layer and positioned between the second metal layer and the protective coating.

7. The flexible display device of claim 1, wherein the first metal layer comprises one of: copper and nickel, and the second metal layer comprises one of: nanocrystalline cobalt, aluminum, gold, silver, platinum, or palladium.

8. The flexible display device of claim 1, further comprising a transitional material layer disposed on the second metal layer and positioned between the second metal layer and the protective coating, the transitional material layer comprising a metal oxide material or a metal nitride material, and the protective coating comprises an anti-fingerprint (AFP) material.

9. The flexible display device of claim 8, further comprising a primer material layer disposed between the transitional material layer and the protective coating.

10. The flexible display device of claim 1, wherein the one or more side surfaces contact the flexible cover lens.

11. A flexible electronic device, comprising:
a flexible housing, comprising:
a flexible polymer substrate having a first surface at least partially forming a recessed region and a second surface opposing the first surface;
a first metal layer covering at least a portion of the second surface of the flexible polymer substrate;
a second metal layer disposed on the first metal layer; and
a protective coating covering the second metal layer.

12. The flexible electronic device of claim 11, wherein the flexible polymer substrate comprises a flexible thermoplastic elastomer (TPE) substrate and a laser direct structuring (LDS) additive material blended with the TPE substrate.

13. The flexible electronic device of claim 11, wherein the first metal layer comprises one of: copper or nickel and the second metal layer comprises one of: nanocrystalline cobalt, aluminum, gold, silver, platinum, or palladium.

14. The flexible electronic device of claim 11, further comprising a transitional material layer disposed on the second metal layer and positioned between the second metal layer and the protective coating.

15. The flexible electronic device of claim 14, further comprising a primer material layer disposed between the transitional material layer and the protective coating.

16. The flexible electronic device of claim 11, wherein the recessed region is configured to receive components of the flexible electronic device, the flexible electronic device further comprising a flexible cover lens positioned over the recessed region and coupled to the flexible housing.

* * * * *